May 24, 1960  J. J. A. ROBILLARD  2,937,562
ELECTRODYNAMIC SPECTROGRAPH
Filed Oct. 1, 1956  3 Sheets-Sheet 1

INVENTOR,
JEAN JULES ACHILLE ROBILLARD
BY Campbell, Brumbaugh
Free and Graves
HIS ATTORNEYS May 24, 1960   J. J. A. ROBILLARD   2,937,562
ELECTRODYNAMIC SPECTROGRAPH
Filed Oct. 1, 1956   3 Sheets-Sheet 3

INVENTOR,
JEAN JULES ACHILLE ROBILLARD

HIS ATTORNEYS

United States Patent Office 2,937,562
Patented May 24, 1960

2,937,562

ELECTRODYNAMIC SPECTROGRAPH

Jean Jules Achille Robillard, Stockholm-Vallingby, Sweden, assignor to Motorola, Inc., Chicago, Ill., a corporation of Illinois Filed Oct. 1, 1956, Ser. No. 613,803

17 Claims. (Cl. 88—14)

This application is a continuation-in-part of application Serial No. 549,337, now abandoned, filed November 28, 1955.

This invention relates to apparatus adapted to provide an indication of the wave length spectrum of electromagnetic radiation in the frequency range which includes, say, ultraviolet, visible light and infrared. More particularly, this invention relates to apparatus of this sort which photoelectrically obtains an indication of the said wave length spectrum.

It is an object of this invention to eliminate the necessity for using prisms, optical gratings and light elements in an apparatus designed to provide a wave length spectrum indication.

It is a further object of this invention to provide apparatus wherein the spectrum position and intensity of one or more wave lengths in a spectrum may be indicated with great accuracy.

It is a further object of the invention to provide for simple and effective correlation of the position and intensity indications of one or more wave lengths in a wave length spectrum.

These and other objects are realized according to the invention by providing collimator means to render parallel the rays of light to be analyzed for its wave length spectrum, means to generate a standing wave pattern from this collimated light, means to cause the standing wave pattern to shift back and forth in space from a reference position, and a thin body of photo-electrically responsive material disposed in the path of shift of the standing wave pattern such that one or more intensity peaks of the pattern are shifted from one side to the other of this layer. In response to the relative shift of an intensity peak in respect to the layer, the layer will photoelectrically respond to the change in intensity detected thereby to develop an electric signal representative of the variation in intensity of the standing wave pattern. This electric signal may, according to a feature of the invention, be supplied to a cathode ray tube to provide a visual picture of the wave length spectrum, or may, alternatively, be supplied to some other form of indicating, registering, or recording device.

For a better understanding of the invention, reference is made to the following representative embodiments thereof taken in conjunction with the accompanying drawings wherein.

Figure 1:
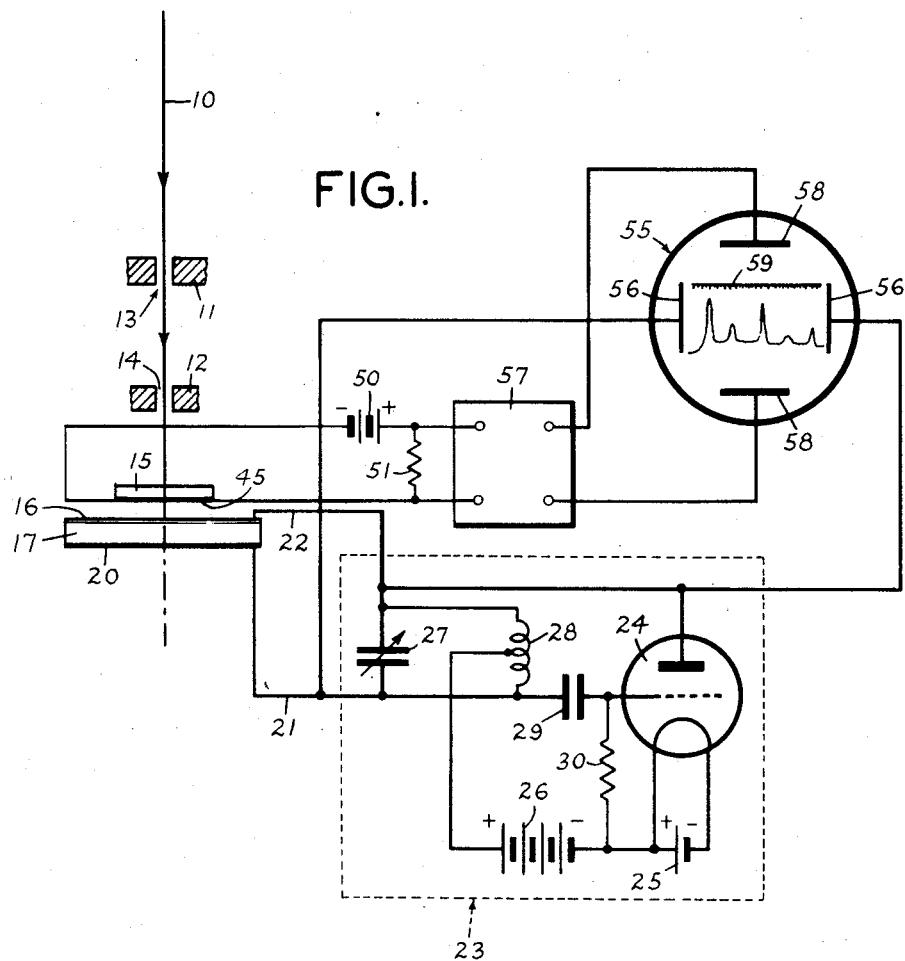
Fig. 1 is a schematic diagram of apparatus according to the invention.

Referring to Fig. 1 a body of light 10 to be analyzed for wave length is passed downward through collimator mans which may take the form, for example, of a pair of spaced diaphragm members 11, 12 having respective apertures 13, 14 formed therein to render parallel to rays of the body of light 10. The collimated light passes through a transparent member 15 to means adapted to generate an interference pattern from the collimated light. This interference pattern generating means may take the form, for example, of a planer reflector disposed at right angles to the direction of movement of the collimated light to thereby reflect each ray thereof back upon itself. In this manner, the planer reflector will generate an interference pattern of standing waves to be later described in greater detail. The interference pattern generating means is caused to be displaced back and forth in space by the driving action of an electromechanical transducer means. As shown in Fig. 1, the interference pattern generating means and the electromechanical transducer means may be conveniently combined together into one unit by utilizing a quartz crystal 17 as the transducer means and by having the planer reflector 16 take the form of an electrically conducting light reflecting coating upon the top surface of the crystal. It will be understood, however, that other transducer means may be used as, for example, a transducer comprised of piezoelectric ceramic material or a transducer which employs magnetostrictive material.

The crystal 17 has the bottom surface thereof coated with an electrically conducting metallic coating 20. This lower coating 20 together with the upper coating 16 are adapted to serve as the two electrodes for inducing the piezoelectric action in the crystal. To induce mechanical vibrations in the crystal an oscillatory electric signal is applied between the electrodes 16 and 20. This signal is supplied to the electrodes by the leads 21, 22 from an oscillatory signal source 23 which may be formed, for example, of a triode 24, a filament heating source 25, a plate voltage source 26, a tuned circuit of variable capacitor 27 and inductance 28 and a grid input circuit of capacitor 29 and resistor 30, the components just recited being connected together as a Hartly oscillator. The oscillator 23 may be tuned by capacitor 27 to the resonant frequency of crystal 17. At this frequency the crystal will synchronously expand and contract in its thickness dimension. The underside of the crystal is maintained in fixed spatial position by being mounted on a base (not shown). It follows that the full crystal movement will be imparted to the upper coating 16 such that this upper coating moves parallel to itself back and forth in the direction of movement of the collimated light 10.

Figure 2:
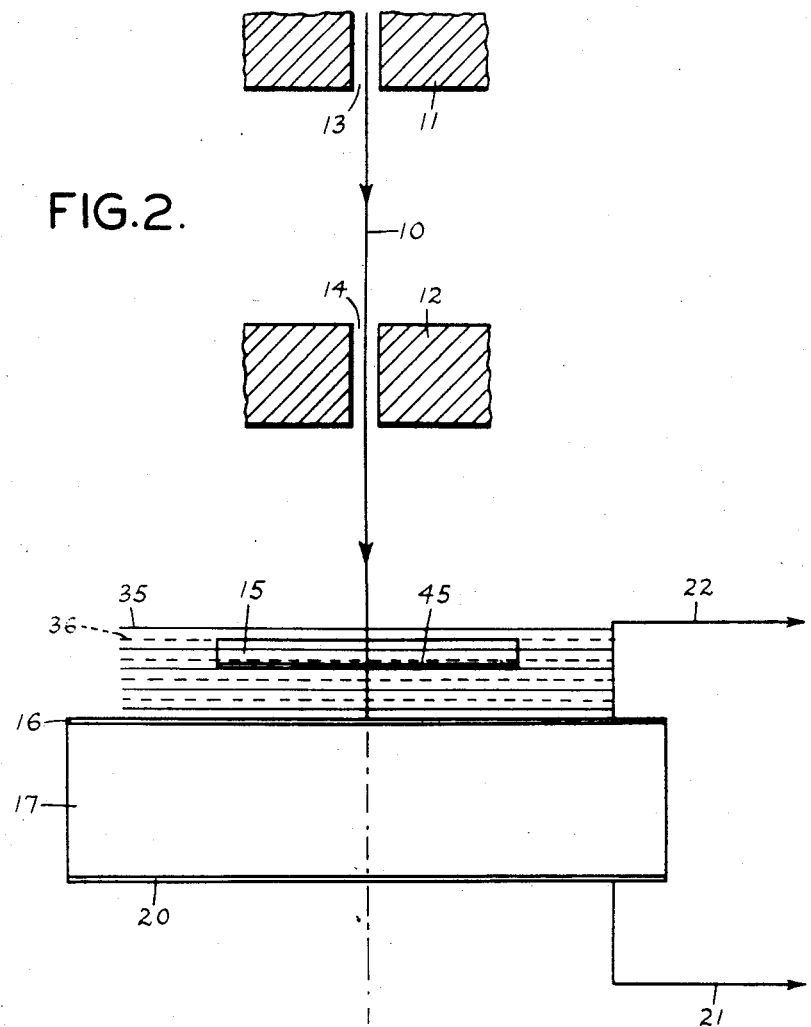
Fig. 2 is a diagram explanatory of the operation of the apparatus of Fig. 1.

Fig. 2 illustrates the standing wave interference pattern created by the coating 16 when the incident collimated light 10 is monochromatic. The creation of the standing wave pattern may be explained in the following simplified manner. The peaks and valleys of the incoming moving waves of light 10 meet with the peaks and valleys of the moving waves of light 10 reflected back on itself from the surface of coating 16. In this situation there will occur alternate reinforcement and cancellation between the incident waves and the reflected waves to result in a set of standing waves in the region of space above the coating 16. These standing waves are represented in Fig. 2 by the solid lines 35 representing intensity peaks and the dotted lines 36 representing intensity nodes. As shown, the interval between two adjacent intensity peaks of a value $w/2$ where $w$ is the wave length of the monochromatic light 10.

Figure 3:
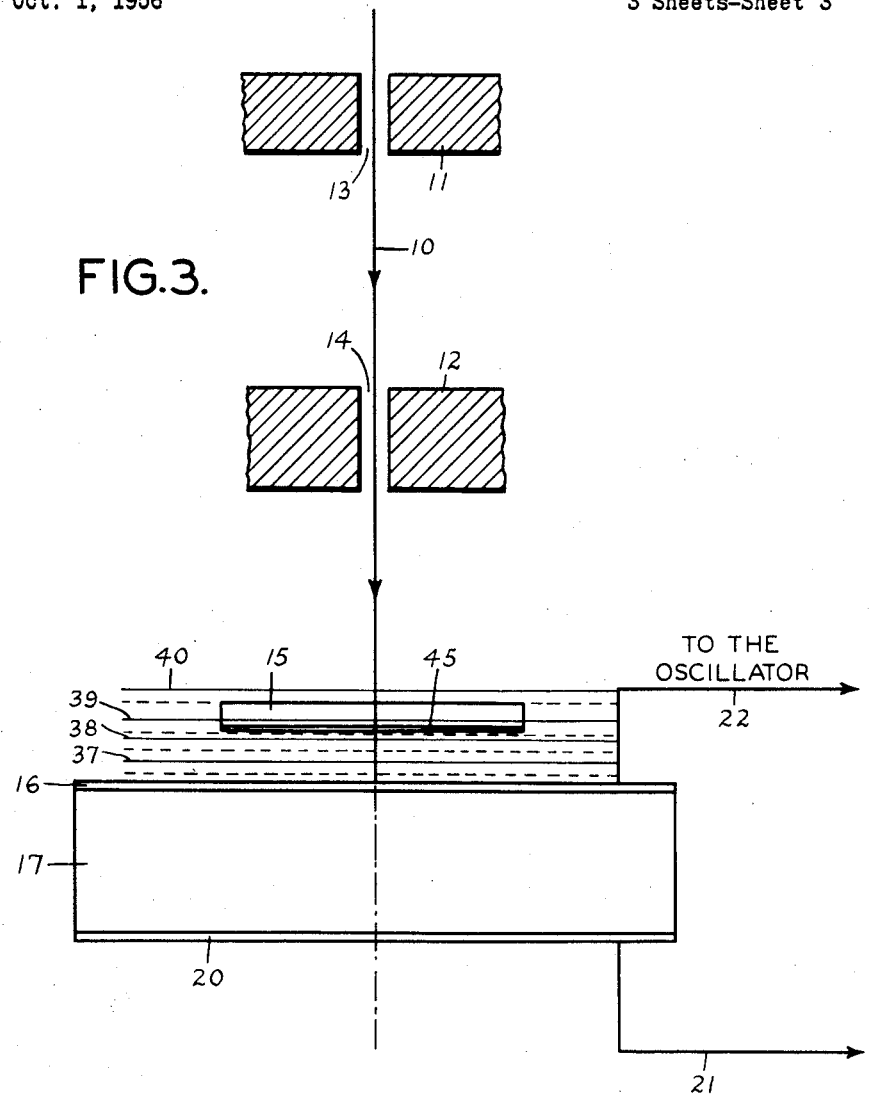
Fig. 3 is a diagram which is further explanatory of the operation of the apparatus of Fig. 1.

Fig. 3 illustrates the standing wave pattern developed by coating 16 when the light 10 to be analyzed is polychromatic. As shown in Fig. 3, if the light 10 contains wave lengths $w_1$, $w_2$, $w_3$, $w_4$ the standing wave pattern in the space above coating 16 will be characterized by intensity peaks 37, 38, 39, 40 corresponding to the wave lengths $w_1$, $w_2$, $w_3$, $w_4$. In both the standing wave pattern of Fig. 2 and the standing wave pattern of Fig. 3 any given intensity peak in the pattern represents by its displacement from a reference position the wave length value of the light wave length which forms the peak, and represents by its relative intensity the relative intensity of the wave length of light which forms the peak. The reference position from which the displacement of each standing intensity peak is measured may be the datum position provided by the coating 16 when zero signal is impressed across the crystal 17, or may also be the datum position occupied at all times by the undercoating 20 for the crystal 17.

When the crystal 17 has no signal impressed thereacross, the intensity peaks of the standing wave patterns of Figs. 2 and 3 remain fixed in space. When, however, the crystal is energized at its resonant frequency by an electric signal from oscillator 23, the resulting displacements of coating 16 back and forth in the movement direction of light 10 will cause equal displacement back and forth from their initial positions of the intensity peaks in the standing wave patterns of Figs. 2 and 3. As the standing wave patterns so shift back and forth, the intensity distribution of the patterns in the direction of shift thereof is determined by an extremely thin body 45 of photoelectrically responsive material which may be, say, photoelectrically activated metallic germanium, and which is deposited as a coating on the underside of the transparent member 15. The photoelectrically responsive coating is sufficiently thin that the coating is substantially transparent to the wave length or wave lengths of which light 10 is composed. Thus, as the standing wave patterns of Figs. 2 and 3 shift back and forth, the various intensity peaks and valleys of these patterns pass freely back and forth through the coating 45. In practice, it is not difficult to obtain a coating 45 which is of sufficient thinness to be substantially transparent to the standing wave pattern. Of course, to provide for resolution of the intensity distribution of the standing wave pattern, the coating 45 should have a thickness dimension which is less than half a wave length for the shortest wave length which it is desired to detect in the light 10. As a further consideration, the smaller the thickness dimension of the coating 45, the higher the resolution which can be obtained by coating 45 of the intensity distribution of a standing wave pattern in the direction of shift thereof.

In the Fig. 1 system, the layer 45 is in the nature of a layer of photoconductive material whose impedance varies as a function of the intensity of light to which the layer is exposed. A measure of the impedance of layer 45 is obtained by a circuit wherein a voltage source 50, a load resistor 51 and the layer 45 are serially connected in a loop circuit. As the impedance of layer 45 decreases, the current induced in the loop circuit by source 50 increases to produce an increase in the voltage across resistor 51. Conversely, as the impedance of layer 45 increases, the voltage across resistor 51 decreases. It will thus be seen that the voltage across resistor 41 is an electric signal whose amplitude varies as a function of the instantaneous light intensity at layer 45.

As stated, the mechanical vibrations induced in crystal 17 by the oscillatory signal impressed thereon produce a shifting of the standing wave pattern of Figs. 2 and 3 such that the patterns pass through layer 45. During the half cycle of the oscillatory signal which causes the crystal to expand, and which may be, say, the first half of the signal cycle, the Fig. 2 and Fig. 3 standing wave patterns will pass through layer 45 with a movement which is all in one direction. In the case of the Fig. 2 pattern the amount of movement imparted thereto by the crystal is, preferably, at least as great as the displacement between two adjacent peaks of the pattern. In the case of the Fig. 3 pattern the amount of movement imparted thereto by crystal 17 should be sufficiently great to pass through the layer at least one of the intensity peaks developed by each wave length which it is desired to detect. From what has been said, it will be seen that, during the first half of the oscillatory signal cycle, the electric signal developed across load resistor 51 will reproduce the intensity distribution in the direction of pattern shift of the standing wave pattern which is passed through layer 45. The time distribution of amplitude of the electric signal will thus take the form of one or more amplitude peaks. The time displacement of each amplitude peak from a reference time is a measure of the wavelength value of a corresponding wave length in the light 10. The amplitude value of each amplitude peak is a relative measure of the intensity of the light 10 at the wave length corresponding to the amplitude peak.

As will be seen from the foregoing discussion, the change in displacement of reflector 16 relative to photoconductive layer 45 and the distribution of intensity values in the standing wave pattern are two parameters which are interrelated in the sense that if either parameter is known, the other parameter can be determined. Heretofore, the invention described herein has been considered in terms of the situation where the relative change in displacement between reflector 16 and layer 45 and the distribution of intensity values in the standing wave pattern are, respectively, the known and the unknown parameters, and where the intensities detected by layer 45 are correlated with the corresponding known amounts of displacement of reflector 16 relative to layer 45 to enable an analysis to be made of the wavelengths of radiation which form the standing wave pattern.

It will be evident, however, that the present invention may also be considered in terms of the converse situation where the distribution of intensities in the standing wave pattern is known but where the relative displacement between elements 16 and 45 which causes the shift in the standing wave pattern is unknown and is, hence, the factor to be determined. As an example, assume that the radiation 10 is monochromatic in nature to form a standing wave pattern which, as shown in Fig. 2, consists of similar periodic variations of intensity recurring over successive equal-size space intervals such that adjacent intensity peaks (which, say, mark the beginning and end of one intensity variation) are separated by half the wavelength of the monochromatic radiation. Assume further that the wavelength of the monochromatic radiation is known. In this instance the standing wave pattern provides a highly accurate "yardstick" for gauging any relative movement which may occur between reflector 16 and layer 45. Such gauging is carried out by detecting the number of periodic variations in the standing wave pattern which are swept through layer 45 in consequence of the shift induced in the pattern by such movement (the number of such variations being proportional to the amount of such movement), and by multiplying the number of periodic variations so detected by half the known wavelength of the monochromatic radiation. In this manner there is obtained the actual value of the amount of relative movement between reflector 16 and layer 45. It will be noted that the value so obtained applies not only to relative movement considered as taking place between reflector 16 and layer 45 but also to relative movement considered as taking place between reflector 16 and any means having a fixed position in relation to layer 45, or to relative movement considered as taking place between layer 45 and any means having a fixed position in relation to reflector 16. Since an electro-optical organization according to the invention is, as described, capable of detecting and measuring a relative change in position of reflector 16 or layer 45 or of means fixedly positioned in relation to either of these elements, the invention is of application in instances where, as in extremely high precision mechanical gauging, it is necessary to determine the extent of very small positional change which takes place in a surface, or an object, or the like.

The information represented by the signal across resistor 51 may conveniently be presented in the following manner. A cathode ray tube 55 is connected to have its horizontal deflecting plates 56 receive the oscillatory signal from oscillator 23. The plates 56 will thus cause a horizontal time base line to be generated on the face of the tube during the first half of an oscillatory signal cycle. A suitable blanking circuit is incorporated into the cathode ray tube to blank out the retrace during the second half of the oscillatory signal cycle. The signal across resistor 51 is supplied through a resistance-capacitance coupled amplifier 57 to the vertical deflecting plates 58 of the cathode ray tube. The amplitude peaks of the signal across resistor 51 will thus appear on the face of the tube as vertical deflections in the horizontal time base line. For convenience in measuring the horizontal position at which these deflections occur, the cathode ray tube may incorporate measuring means as, say, a scale 59 extending across the face of the cathode ray tube, or another horizontal sweep line which is subdivided into unit horizontal displacement divisions by small vertical deflections in the form of marker pips.

In some instances it is desirable to have a permanent record of the wave length content of light 10, and to moreover have this record in binary digit form in order that the record be suitable for operating computing devices. Such permanent form of record may be obtained by an organization wherein the signal from the oscillator 23 is fed through a series of frequency multiplier and clipper stages which produce, say, 1,028 pulses occurring at equal time intervals over the first half of the cycle of the signal from oscillator 23. This train of pulses is fed to the input of a multistage binary counter adapted to reset itself at a count of 1,028. The several stages of the counter which represent binary digits of different rank may be respectively connected through a switching circuit to a plurality of corresponding stages in a first binary register or a plurality of corresponding stages in a second binary register, and so on. The number of binary registers is equal to the number of intensity peaks which it is desired to detect in light 10. The electric signal across load resistor 51 is fed through amplifier 57 to the switching circuit to cause this circuit to respond to the first amplitude peak to connect the counter to the first register, to cause this circuit to respond to the second amplitude peak to connect the counter to the second register, and so on. Thus at the end of the first half of the cycle of the signal of oscillator 23, the several binary registers will display in terms of respective binary numbers the time displacement of each amplitude peak from a reference time. As stated, these time displacements are measures of the wave lengths found in light 10. The several binary numbers so registered can be transferred in a conventional manner from the registers to a recording tape to be later used in computing devices.

The above-described embodiments of the invention being exemplary only, it will be seen that the invention herein extends to embodiments differing in form or detail from the above-described embodiments.

For example, while photoelectric layer 45 has been disclosed herein as a photoconductive layer, the layer 45 may also be a photoemissive layer which acts as a cathode in an electron discharge device which utilizes the coating 16 as an anode, and which is in the form of a vacuum tube having an envelope enclosing the member 15 and crystal 17 to maintain a vacuum therebetween. The electron current which flows between cathode layer 45 and anode coating 16 may be determined by incorporating the described electron discharge device into a conventional photoelectric vacuum tube circuit.

Accordingly, the invention is not to be considered as limited save as is consonant with the scope of the following claims.

I claim:
1. Apparatus comprising, collimator means to render parallel the rays of a body of electromagnetic radiation of which the upper limit for wavelength is the infrared wavelength region of the electromagnetic spectrum, interference pattern generator means disposed in the path of said parallelized rays to develop therefrom a standing wave pattern characterized by spatially distributed variations in intensity of said radiation, a thin body of photoelectrically responsive material substantially transparent in its thin dimension to said radiation and disposed to transect said pattern substantially normally of the direction of distribution of said intensity variations, said thin body of photoelectrically responsive material having a thickness in its thin dimension which is less than half the wavelength value of at least one of the wavelengths characterizing said radiation, means to shift said pattern relative to said material by an amount at least equal to the said thickness of said thin body of material, and means to detect the photoelectric response of said material to intensity variations of said radiation which are swept through said body of material by said pattern shift.

2. Apparatus to determine the wavelength content within a preselected range of wavelengths of a body of electromagnetic radiation of which the upper limit for wavelength is the infrared wavelength region of the electromagnetic spectrum, said apparatus comprising, collimator means to render parallel rays of said radiation, interference pattern generator means disposed in the path of said parallelized rays to develop therefrom a standing wave pattern characterized by variations in intensity of said radiation which are spatially distributed to be indicative of said wavelength content, a thin body of photoelectrically responsive material substantially transparent in its thin dimension to said radiation and disposed to transact said pattern substantially normally of the direction of distribution therein of said intensity variations, said thin body of photoelectrically responsive material having a thickness in its thin dimension which is less than half the shortest wavelength in said preselected range of wavelengths, electromechanical transducer means adapted by a mechanical change in dimension thereof to shift said pattern relative to said material by an amount at least equal to half the longest wavelength in said preselected range thereof, and means to detect the photoelectric response of said material to intensity variations of said radiation which are swept through said body of material by said pattern shift.

3. Apparatus as in claim 2 further characterized by electrical energy source means connected to electrically drive said transducer means at the frequency of mechanical resonance in said dimension of said tranducer means.

4. Apparatus as in claim 3 where said transducer means is a piezoelectric element and wherein said electrical energy source is an alternating voltage source.

5. Apparatus comprising, collimator means to render parallel the rays of a body of electromagnetic radiation of which the upper limit for wavelength is the infrared wavelength region of the electromagnetic spectrum, reflector means disposed in the path of said parallelized rays and providing a reflecting surface normal to said rays to develop by interaction of rays incident on and rays reflected from said surface a standing wave pattern characterized by a distribution of variations in intensity of said radiation in the length of said path, a thin body of photoelectrically responsive material substantially transparent in its thin dimension to said radiation and disposed in said path to transect said pattern substantially normally of the direction of distribution of said intensity variations, said thin body of photoelectrically responsive material having a thickness in its thin dimension which is less than half the wavelength value of at least one of the wavelengths characterizing said radiation, means adapted by relatively moving said reflector means and material to shift said pattern relative to said material by an amount at least equal to the said thickness of said thin body of said material, and means to detect the photoelectric response of said material to intensity variations of said radiation which are swept through said body of material by said pattern shift.

6. Apparatus comprising, collimator means to render parallel the rays of a body of electromagnetic radiation of which the upper limit for wavelength is the infrared wavelength region of the electromagnetic spectrum, a piezoelectric element in the path of said parallelized rays and having a back face of fixed position and a front face presented towards said rays in normal relation thereto, a radiation-reflecting coating on said front face adapted by reflecting said rays to develop by interaction of rays incident on and rays reflected from said coating a standing wave pattern characterized by a distribution of variations in intensity of said radiation in the length of said path, a thin body of photoelectrically responsive material substantially transparent in its thin dimension to said radiation and disposed to transect said standing wave pattern substantially normally of the direction of distribution of said intensity variations, said thin body of photoelectrically responsive material having a thickness in its thin dimension which is less than half the wavelength value of at least one of the wavelengths characterizing said radiation, means to apply voltage to said element to change the dimension thereof between said faces to thereby shift said pattern relative to said material by an amount at least equal to the said thickness of said thin body of material, and means to detect the photoelectric response of said material to intensity variations of said radiation which are swept through said body of material by said pattern shift.

7. Apparatus comprising, collimator means to render parallel rays of electromagnetic monochromatic radiation of which the upper limit for wavelength is the infrared wavelength region of the electromagnetic spectrum, interference pattern generator means disposed in the path of said parallelized rays to develop therefrom a standing wave pattern of distributed intensity values characterized by intensity variations recurring periodically in a succession of space intervals in said pattern, a thin body of photoelectrically responsive material substantially transparent in its thin dimension to said radiation and disposed to transect said pattern substantially normally of the direction of distribution of said intensity values, said thin body of photoelectrically responsive material having a thickness in its thin dimension which is less than half the wavelength of said monochromatic radiation, means adapted by relatively moving said interference pattern generator means and said material to shift said pattern relative to said material by an amount at least equal to the said thickness of said thin body of material, and means adapted by detecting the photoelectric response of said material to intensity variations of said radiation which are swept through said body of material by said pattern shift to provide an indication of the number of said swept variations in intensity.

8. Apparatus comprising, collimator means to render parallel rays of electromagnetic monochromatic radiation of which the upper limit for wavelength is the infrared wavelength region of the electromagnetic spectrum, reflector means disposed in the path of said parallelized rays and providing a reflecting surface normal to said rays to develop by interaction of rays incident on and rays reflected from said surface a standing wave pattern of intensity values distributed in the length of said path and characterized by intensity variations recurring periodically in successive space intervals along said path, a thin body of photoelectrically responsive material substantially transparent in its thin dimension to said radiation and disposed in said path to transect said pattern substantially normally of the direction of distribution of said intensity values, said thin body of photoelectrically responsive material having a thickness in its thin dimension which is less than half the wavelength of said monochromatic radiation, means adapted by relatively moving said reflector means and material to shift said pattern relative to said material by an amount at least equal to the said thickness of said thin body of material, and means adapted by detecting the photoelectric response of said material to intensity variations of said radiation which are swept through said body of material by said pattern shift to provide an indication of the number of said swept variations in intensity.

9. Apparatus comprising, collimator means to render parallel rays of monochromatic radiation, interference pattern generator means disposed in the path of said parallelized rays to develop therefrom a standing wave pattern of distributed intensity values characterized by intensity variations recurring periodically in successive equal-size space intervals in said pattern, a photoelectrically responsive film of semiconductor material substantially transparent to said radiation and of lesser thickness than the size of said intervals, said film having an impedance transverse to said thickness which varies in accordance with the intensity of radiation to which said film is exposed and said film being disposed to transect said pattern transversely of the direction of distribution of said intensity values, means adapted by relatively moving said interference pattern generator means and said film to shift said pattern relative to said film to thereby produce a sweep through said film of distributed intensity values of said pattern, means to pass current through a stretch of said film transverse to the thickness thereof, and means to indicate variations induced in said current by the variable impedance response of said film to intensity variations of said radiation which are swept through said film by said pattern shift.

10. Apparatus comprising, collimator means to render parallel rays of monochromatic radiation, reflector means disposed in the path of said parallelized rays and providing a reflecting surface normal to said rays to develop by interaction of rays incident on and rays reflected from said surface a standing wave pattern of intensity values distributed in the length of said path and characterized by intensity variations recurring periodically in successive equal-size space intervals in said pattern, a photoelectrically responsive film of semiconductor material substantially transparent to said radiation and of lesser thickness than the size of said intervals, said film having an impedance transverse to said thickness which varies in accordance with the intensity of radiation to which said film is exposed and said film being disposed to transect said pattern transversely of the direction of distribution of said intensity values, means adapted by relatively moving said reflector means and said film to shift said pattern relative to said film to thereby produce a sweep through said film of distributed intensity values of said pattern, means to pass current through a stretch of said film transverse to the thickness thereof, and means to indicate variations induced in said current by the variable impedance response of said film to intensity variations of said radiation which are swept through said film by said pattern shift.

11. Apparatus to determine the wavelength content of a body of radiation comprising, collimator means to render parallel rays of said radiation, interference pattern generator means disposed in the path of said parallelized rays to develop therefrom a standing wave pattern indicative of said wavelength content, a photoelectrically responsive film of semiconductor material substantially transparent to said radiation and of lesser thickness than half the shortest radiation wavelength to be determined, said film being variable in impedance transverse to its thickness in accordance with the intensity of radiation to which the film is exposed and being disposed to transect said pattern transversely of the direction of distribution of the intensity values thereof, means to shift said pattern relative to said film to produce a sweep through said film of distributed intensity values of said pattern, means to pass current through a stretch of said film transverse to the thickness thereof, and means to indicate variations induced in said current by the variable impedance response of said film to intensity values of said radiation which are swept through said film by said pattern shift.

12. Apparatus comprising, collimator means to render parallel the rays of a body of radiation, reflector means disposed in the path of said parallelized rays and providing a reflecting surface normal to said rays to develop by interaction of rays incident on and rays reflected from said surface a standing wave pattern characterized by a distribution of intensity values in the length of said path, a photoelectrically responsive film of semiconductor material substantially transparent to said radiation and of lesser thickness than half the shortest radiation wavelength to be determined, said film being variable in impedance transverse to its thickness in accordance with the intensity of radiation to which the film is exposed and being disposed to transect said pattern transversely of the direction of distribution of said intensity values, means adapted by relatively moving said reflector means and material to shift said pattern relative to said material to thereby produce a sweep through said material of distributed intensity values of said pattern, means to pass current through a stretch of said film transverse to the thickness thereof, and means to indicate variations induced in said current by the variable impedance response of said film to intensity values of said radiation which are swept through said film by said pattern shift.

13. Apparatus comprising, collimator means to render parallel the rays of a body of radiation, reflector means disposed in the path of said parallelized rays and providing a reflecting surface normal to said rays to develop by interaction of rays incident on and rays reflected from said surface a standing wave pattern characterized by a distribution of intensity values in the length of said path, a photoelectrically responsive film of semiconductor material substantially transparent to said radiation and of lesser thickness than half the shortest radiation wavelength to be determined, said film being variable in impedance transverse to its thickness in accordance with the intensity of radiation to which the film is exposed and being disposed to transect said pattern transversely of the direction of distribution of said intensity values, electromechanical transducer means mechanically coupled to said reflector means and adapted by a mechanical change in dimension thereof to move said reflector means relative to said film to thereby shift said pattern relative to said film, said shift producing a sweep through said film of distributed intensity values of said pattern, means to pass current through a stretch of said film transverse to the thickness thereof, and means to indicate variations induced in said current by the variable impedance response of said film to intensity values of said radiation which are swept through said film by said pattern shift.

14. Apparatus comprising, collimator means to render parallel the rays of a body of radiation, a piezoelectric crystal element in the path of said parallelized rays and having a back face of fixed position and a front face presented towards said rays in normal relation thereto, a radiation-reflecting coating on said front face adapted by reflecting said rays to develop by interaction of rays incident on and rays reflected from said coating a standing wave pattern characterized by a distribution of intensity values in the length of said path, a photoelectrically responsive film of semiconductor material substantially transparent to said radiation and of lesser thickness than half the shortest radiation wavelength to be determined, said film being variable in impedance transverse to its thickness in accordance with the intensity of radiation to which the film is exposed and being disposed to transect said pattern transversely of the direction of distribution of said intensity values, means to apply voltage to said element to change the dimension thereof between said faces to thereby shift said pattern relative to said material, said shift producing a sweep through said material of distributed intensity values of said pattern, means to pass current through a stretch of said film transverse to the thickness thereof, and means to indicate variations induced in said current by the variable impedance response of said film to intensity values of said radiation which are swept through said film by said pattern shift.

15. Apparatus to determine the wavelength content of a body of radiation comprising, collimator means to render parallel rays of said radiation, reflector means disposed in the path of said parallelized rays and providing a reflecting surface normal to said rays to develop by interaction of rays incident on and rays reflected from said surface a standing wave pattern characterized by a distribution of intensity values in the length of said path, a photoelectrically responsive film of semiconductor material substantially transparent to said radiation and of lesser thickness than half the shortest radiation wavelength to be determined, said film being variable in impedance transverse to its thickness in accordance with the intensity of radiation to which the film is exposed and being disposed to transect said pattern transversely of the direction of distribution of said intensity values, electromechanical transducer means mechanically coupled to said reflector means and adapted by a mechanical change in dimension thereof to move said reflector means relative to said film to thereby shift said pattern relative to said film, said shift producing a sweep through said film of distributed intensity values of said pattern, means to apply variable electrical energy to said transducer means to vary said dimension in accordance with the variations of said energy, means to pass current through a stretch of said film transverse to the thickness thereof, means responsive to said current to develop electric signals representing variations induced in said current by the variable impedance response of said film to intensity values of said radiation which are swept through said film by said pattern shift, and means responsive to an input corresponding to the variations of said electrical energy and to an input of said signals to provide an indication correlating said swept values with the relative position in said pattern of said swept values.

16. Apparatus to determine the wavelength content of a body of radiation comprising, collimator means to render parallel rays of said radiation, a piezoelectric crystal element in the path of said parallelized rays and having a back face of fixed position and a front face presented towards said rays in normal relation thereto, a radiation-reflecting coating on said front face adapted by reflecting said rays to develop by interaction of rays incident on and rays reflected from said coating a standing wave pattern characterized by a distribution of intensity values in the length of said path, a photoelectrically responsive film of semiconductor material substantially transparent to said radiation and of lesser thickness than half the shortest radiation wavelength to be determined, said film being variable in impedance transverse to its thickness in accordance with the intensity of radiation to which the film is exposed and being disposed to transect said pattern transversely of the direction of distribution of said intensity values, means to apply voltage to said element to change the dimension thereof between said faces to thereby shift said pattern relative to said material, said shift producing a sweep through said material of distributed intensity values of said pattern, means to pass current through a stretch of said film transverse to the thickness thereof, means responsive to said current to develop electric signals representing variations induced in said current by the variable impedance response to said film to intensity values of said radiation which are swept through said film by said pattern shift, and means responsive to an input corresponding to said voltage and to an input of said signals to provide an indication correlating said swept values with the relative position of said swept values in said pattern.

17. Apparatus as in claim 16 wherein said means providing said correlation indication is a cathode ray oscilloscope having separate pairs of deflecting electrodes at right angles to each other, said input corresponding to said voltage and said input of electric signals being respectively applied to one and the other of said pairs of deflecting electrodes.

References Cited in the file of this patent

UNITED STATES PATENTS

| | | |
|---|---|---|
| 1,807,056 | Zworykin | May 26, 1931 |
| 1,810,475 | Hansell | June 16, 1931 |
| 1,940,245 | Carpenter | Dec. 19, 1933 |
| 1,951,523 | Nicolson | Mar. 20, 1934 |
| 2,504,628 | Benzer | Apr. 18, 1950 |
| 2,830,489 | Mitchell et al. | Apr. 15, 1958 |

OTHER REFERENCES

Jenkins and White book, "Fundamentals of Optics," 2nd edition, McGraw-Hill Book Company, Inc., 1950, pages 207–210.